United States Patent [19]

Sasaki et al.

[11] Patent Number: 5,108,672

[45] Date of Patent: Apr. 28, 1992

[54] APPARATUS FOR AND METHOD OF CONTROLLING TEMPERATURE IN PLASTIC COMPRESSION MOLDING MACHINE

[75] Inventors: Yosuke Sasaki, Zama; Noboru Harashima, Fujisawa; Kazuhiro Mimura, Hiratsuka, all of Japan

[73] Assignee: Kabushiki Kaisha Komatsu Seisakusho, Tokyo, Japan

[21] Appl. No.: 499,545

[22] PCT Filed: Oct. 30, 1989

[86] PCT No.: PCT/JP89/01114

§ 371 Date: Jan. 16, 1991

§ 102(e) Date: Jan. 16, 1991

[87] PCT Pub. No.: WO90/05055

PCT Pub. Date: May 17, 1990

[30] Foreign Application Priority Data

Oct. 31, 1988 [JP] Japan .................. 63-275467

[51] Int. Cl.⁵ ................. B29C 43/52; B29C 45/72
[52] U.S. Cl. ................... 264/40.5; 264/299; 264/328.14; 425/143; 425/407; 425/548
[58] Field of Search ............ 264/40.5, 40.6, 299, 264/328.1, 328.14, 328.16; 425/144, 149, 407, 547, 548, 552, 143; 100/38, 46, 93 R, 93 P

[56] References Cited

U.S. PATENT DOCUMENTS

| | | | |
|---|---|---|---|
| 3,775,033 | 11/1973 | Pfeiffer | 425/407 |
| 3,826,601 | 7/1974 | Hütter | 425/406 |
| 4,345,890 | 8/1982 | Hemmi et al. | 425/143 |
| 4,375,785 | 3/1983 | Schoch et al. | 100/35 |

FOREIGN PATENT DOCUMENTS 58-74519 5/1983 Japan .
59-185637 10/1984 Japan .
60-145017 9/1985 Japan .
61-170517 10/1986 Japan .
62-11960 3/1987 Japan .

Primary Examiner—Jill L. Heitbrink
Attorney, Agent, or Firm—Richards, Medlock & Andrews

[57] ABSTRACT

The temperatures of structural members of a plastic compression molding machine are controlled so that the socket-and-spigot gap between the dies is maintained at a constant size or so that changes in the socket-and-spigot gap between the dies is maintained below an allowable limit. Working oil for the lift cylinder is passed through passages in at least the bolster, the slide, and the frame. A temperature controller can include heat exchangers and/or flow-rate control valves to control the temperature and/or flow rate of the portion of the working oil to be circulated through the respective structural member.

23 Claims, 5 Drawing Sheets ns of the dies.

APPARATUS FOR AND METHOD OF CONTROLLING TEMPERATURE IN PLASTIC COMPRESSION MOLDING MACHINE

TECHNICAL FIELD

The present invention relates to an apparatus for and a method of controlling temperature in a plastic compression molding machine More particularly, the present invention relates to an apparatus for and a method of controlling temperature in a plastic compression molding machine suitable for use in a plastic injection compression molding machine which employs a die having a socket-and-spigot type structure.

BACKGROUND ART

In general, injection compression molding of a plastic employs, as one of features thereof, injection of a molten resin or a resin in a fluid state into a cavity in closed dies having socket-and-spigot structures. Then, a relative movement of the dies is caused in the die closing direction by an amount corresponding to the length of the socket-and-spigot structure so as to fluidize the resin in the cavity to distribute the resin to all portions of the die cavity. The dies are then compressed and cooled, thus completing the molding.

In this type of injection compression molding machine, a gap referred to as "shear edge clearance" is formed in the socket-and-spigot structure. In order to prevent generation of burr or fin due to spreading of the resin while ensuring relief of gases and air, it is necessary that the amount of the shear edge clearance be maintained to be about 0.02 to 0.05 mm. Therefore, dies used in this type of molding machine are machined strictly in predetermined size to provide this clearance. In addition, it has been proposed and attempted to independently control the die temperature, in order to avoid non-uniform thermal expansion and contraction while providing optimum cooling rate of the resin. As shown in FIG. 6, the dies are connected to a slide 61 and a bolster 62 of the molding machine. The connection of the dies to the slide 61 and the bolster 62 are conducted through the intermediary of heat-insulating plates 63, in order to prevent transmission of heat while avoiding any undesirable change in the socket-and-spigot gap attributable to a lack of uniformity in the thermal expansion caused by non-uniform temperature distribution of the dies.

On the other hand, the structural members such as the slide, bolster and frames supporting these members also exhibit thermal expansions. The thermal expansions of these members also affect the socket-and-spigot gap. In view of this problem, it has been a common measure to maintain the temperature of the structural members at the same level as the working oil for actuating the press of the machine, so as to maintain a constant value of the shut height which is the distance between the bolster and the slide when the slide is in its lower stroke end. (Japanese Patent Examined Publication No. 62-11960) According to this method, series-type heat exchangers composed of baffles are provided on structural parts of the press of the machine, such as upright posts. In these heat exchangers, the oil of high temperature serves to raise the temperature of the upright posts by making use of wasteful heat which is generated by the actuating assembly and heat produced by friction between parts of the guide assembly, thus maintaining a constant value of the shut height.

In this known method, however, the temperatures of the frames, slide and the bolster are independently controlled to temperatures which are different from that demanded by the actuator of the actuating portion of the machine which is the main source of heat transmitted to various structural members. As a result, different structural parts are heated to different temperatures, resulting in a non-uniform thermal expansion of the whole structure. Consequently, the size of the socket-and-spigot gap is changed despite the presence of the heat-insulating plate provided for maintaining a constant size of the socket-and-spigot gap, due to the difference in the thermal expansion of the structural parts, with the results that the stability of the compression molding and, hence, the stability of quality of the molded products, are undesirably impaired.

In the case of a compression molding machine for molding an article having a large projection area, e.g., 500 mm or greater in side length, the lengths (L mm) of frame or other members made of steel well exceed 1000 mm. In such a case, it is necessary that the temperatures of these members have to be maintained below the temperatures (T° C.) shown in the following Table 1 in order to maintain the amounts of thermal expansion (ΔL mm) below the limit values shown in the table.

TABLE 1

| L mm | T °C. | ΔL mm |
|---|---|---|
| 1000 | 100 | 1.20 |
| 1000 | 10 | 0.12 |
| 1000 | 5 | 0.06 |
| 1000 | 1 | 0.01 |

Under these circumstances, an object of the present invention is to provide an apparatus for and a method of controlling the temperature of a plastic compression molding machine, which is improved to maintain a constant size of the socket-and-spigot gap between the dies regardless of thermal expansions of the bolster, slide and frames, thus ensuring high stability of injection compression molding of a plastic while eliminating secular change.

DISCLOSURE OF THE INVENTION

To these ends, according to a first aspect of the present invention, there is provided an apparatus for controlling temperature in a plastic compression molding machine, comprising: a bolster connected to a stationary die and having a liquid passage provided therein; a slide connected to a movable die and connected to a lift cylinder for driving the movable die towards the stationary die, the slide having a liquid passage provided therein; circulating means for supplying a working oil from a working oil tank to the liquid passages of the bolster and the slide; and temperature control means provided at an intermediate portion of the circulating means and capable of controlling the temperature of the working oil to a set level. According to a second aspect of the invention, the temperature control means is capable of setting the temperature to a level which maintains a dimensional change of the clearance between the dies calculated from the sizes and thermal expansion coefficients of the bolster and the slide below an allowable limit value of the socket-and-spigot gap between the dies. The temperature control means may include a flow-rate control valve or a heat exchanger.

According to the invention, there is also provided a method of controlling temperature in a plastic compression molding machine comprising the steps of: calculating, from the sizes and thermal expansion coefficients of structural members of the plastic compression molding machine including a bolster and a slide, a temperature which maintains the socket-and-spigot gap between dies of the machine below a predetermined allowable limit value; controlling the temperature of the working oil supplied to a lift cylinder and other parts of the compression molding machine to the calculated temperature; and circulating the working oil of the controlled temperature through the structural members. The control of the temperature may be conducted through a heat exchanger or by a combination of a heat exchanger and means for controlling the flow rates of the working oil to the respective structural members.

The structural members may include the frame of the machine. In such a case, the oil of the controlled temperature is circulated through the frame.

According to the invention having the features described above, temperature control devices are provided on the structural parts of the plastic compression molding machine surrounding the dies, such as the bolster, slide and the frame, so as to uniformalize the temperatures and amounts of thermal expansion of these structural parts, and a fluid of a temperature controlled by a temperature control means within a predetermined range of temperature administration is circulated through these temperature control devices. As a consequence, a uniform thermal expansion is developed by the mechanical structural parts around the dies such as the crankshaft, bolster, slide and the frame, thus making it possible to maintain a constant distance (La) between the dies, as well as a constant shear edge clearance (Lb) which appears laterally of the socket-and-spigot portion.

THE BEST MODE FOR CARRYING OUT THE INVENTION

Figure 1:
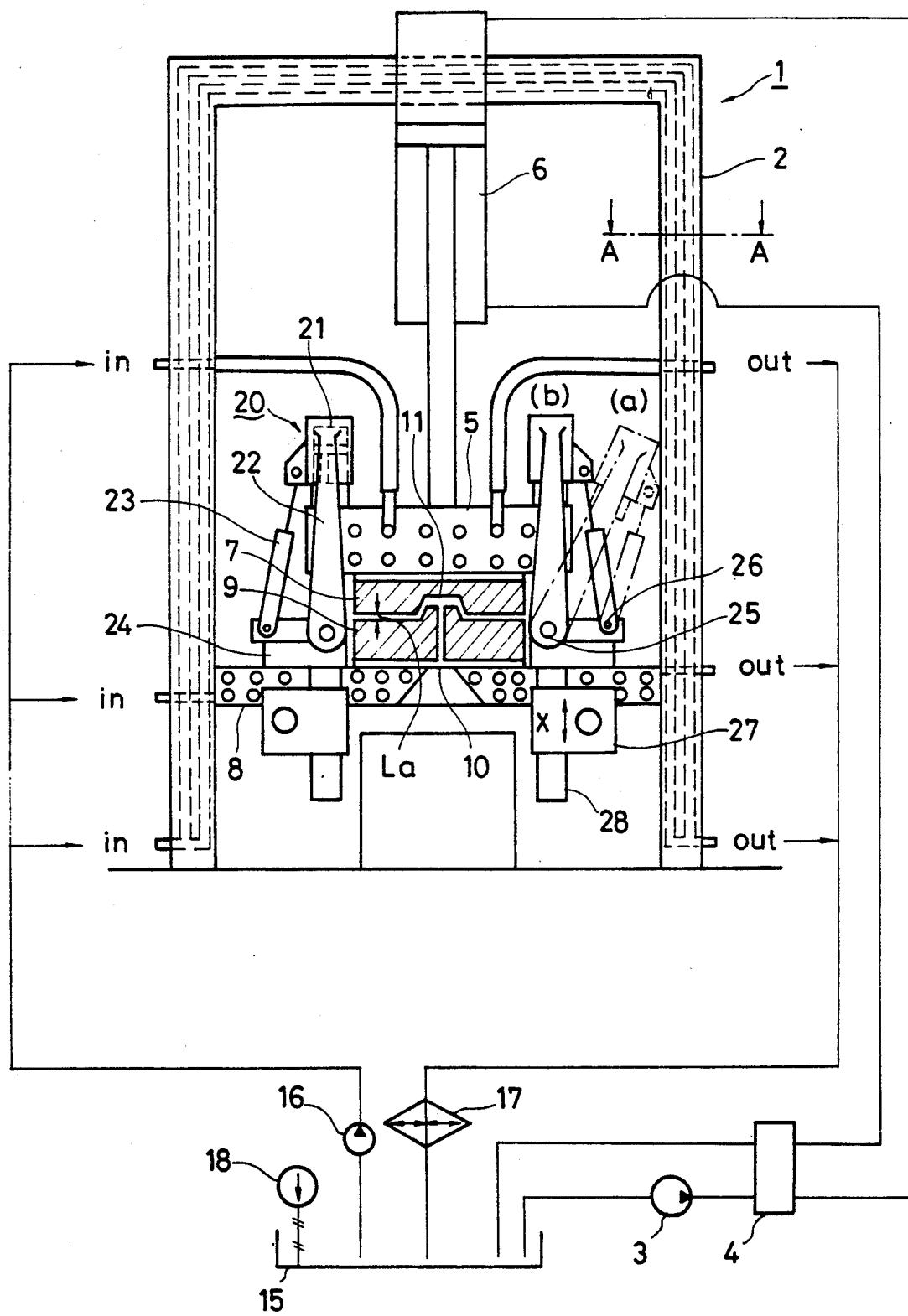
FIG. 1 is a diagrammatic illustration of a first embodiment of the present invention.
Figure 7:
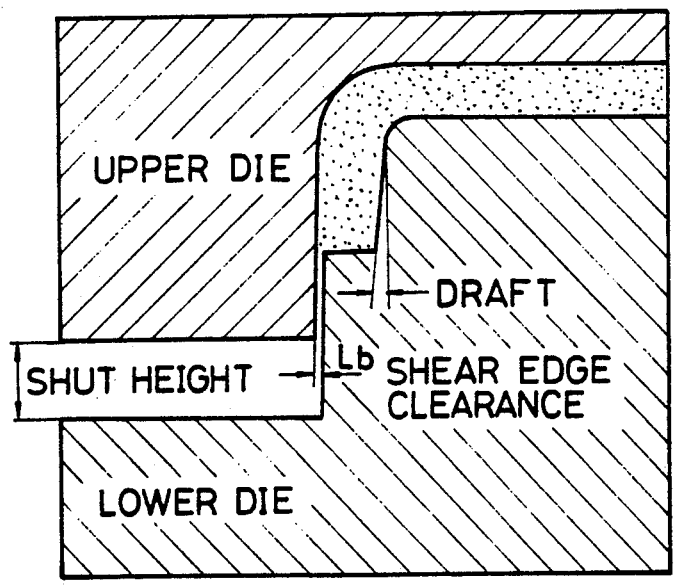
FIG. 7 is an illustration of a shear edge clearance.

A detailed description will be given hereinunder of embodiments of the apparatus and method of the invention for controlling the temperature in a plastic compression molding machine with reference to the accompanying drawings. FIG. 1 illustrates the first embodiment. Referring to FIG. 1, a lift cylinder assembly 6 is fixed to a frame 2 of a plastic compression molding machine 1. The lift cylinder assembly 6 is composed of a lift cylinder capable of slidingly moving a slide 5 upon receipt of hydraulic pressure supplied by a pump 3 through a hydraulic valve 4, as well as a rod received in the cylinder. A movable die 7 is fixed to the slide 5, while a stationary die 9 is fixed to a bolster 8. The stationary die 9 is provided with an injection opening 10 through which a molten resin is injected from an injecting section (not shown) under the bolster 8 into a cavity 11 defined between the dies 7, 9 so as to fill the cavity 11. Stopper mechanisms 20 are provided so as to prevent the movement of the slide 5 in the die parting direction beyond a position where a predetermined distance (La) and shear edge clearance (Lb) (see FIG. 7) are formed between dies 7 and 9. Each stopper mechanism 20 includes a compression cylinder 21 for compressing a resin injected into the cavity 11, a link 22 supporting the compression cylinder 21 and rockably interconnecting the compression cylinder 21 to enable the cylinder 21 to move into and out of a space behind the movable die 9, a lock cylinder 23 for causing a tilting rocking motion of the link 22, a height adjuster 27 having a cylinder frame 24 to which the link 22 and the lock cylinder 23 are fixed through pins 25, 26 and capable of moving the cylinder frame 24 (in X-direction) in conformity with the thickness of the dies and the distance between both dies 7 and 9, and a rod 28. A working oil supplied from a tank 15 by means of a pump 16 is circulated through the frame 2, slide 5 and the bolster 8 so as to realize a uniform temperature distribution over these members. The oil discharged from the frame 2, slide 5 and the bolster 8 is returned to the tank 15 through a temperature controller 17. The tank 15 is provided with a thermometer 18.

Figure 2:
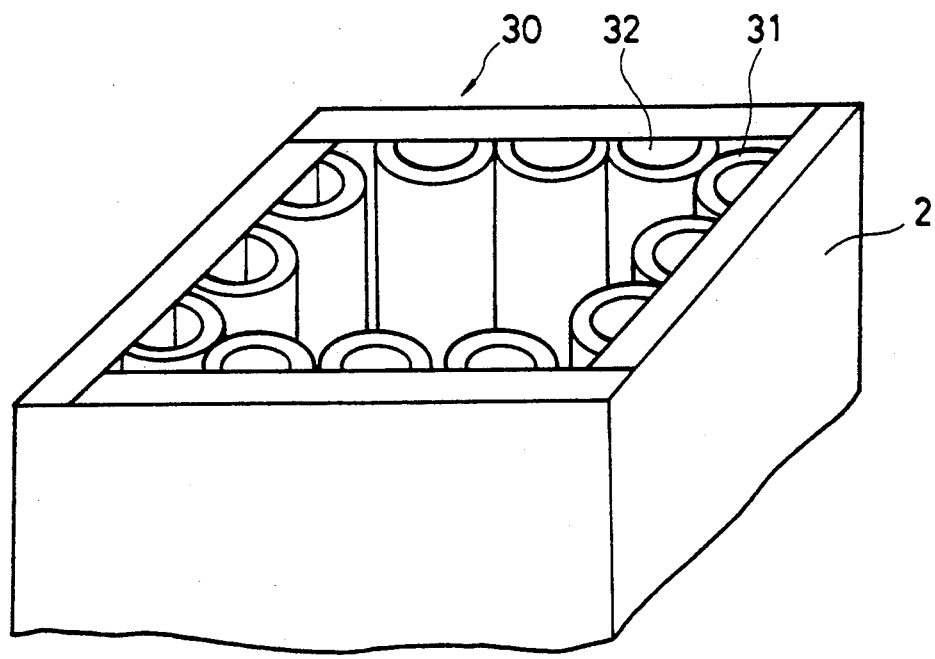
FIG. 2 is an illustration of an example of a temperature control device provided on a frame.

FIG. 2 shows a cross-section of the frame taken along the line A—A in FIG. 1, illustrating an example of the temperature control device 30 for the frame 2. The device 30 has a plurality of split pipes 31 which are welded to the walls of the frame 2 so as to define passages for the oil supplied by the pump 16. The frame 2 also is provided on its surface with a later-mentioned temperature sensor.

Figure 3:
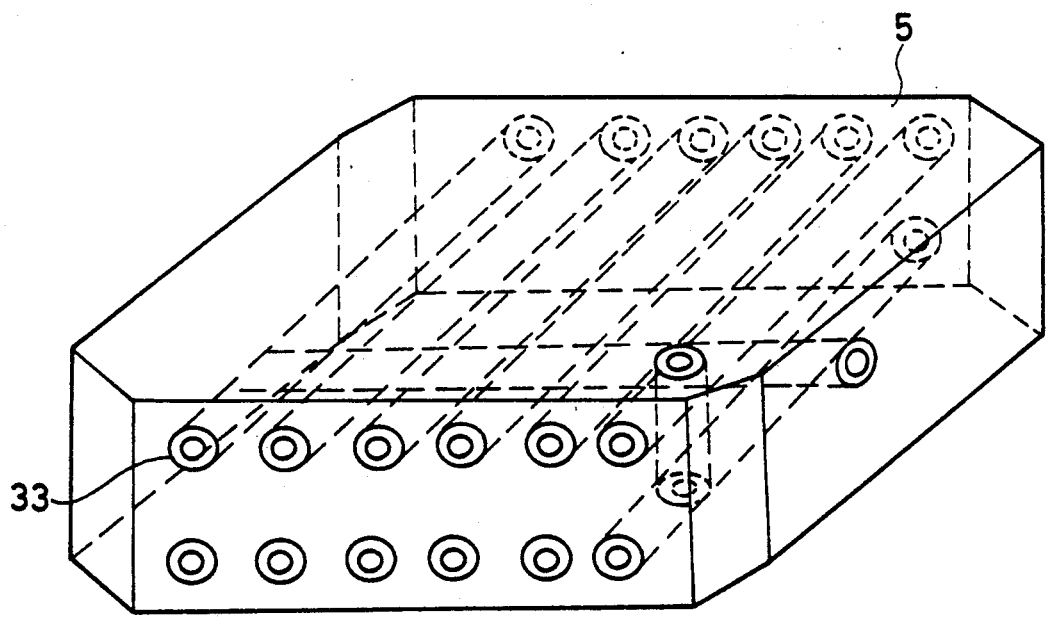
FIG. 3 is an illustration of a method for controlling temperatures of a slide and a bolster.

FIG. 3 illustrates an example of the temperature control for the slide 5 and the bolster 8. A multiplicity of conduits 33 for temperature control are extended through the interior of each of the slide 5 and the bolster 8 in a crossing manner. The working oil flows through these conduits.

The compression molding machine having the described construction operates in a manner which will be explained hereinunder.

For the purpose of conducting injection compression molding, hydraulic pressure is supplied by a pump 3 to the lift cylinder 6 so that the slide 5 is moved to a predetermined position wherein the movable die is spaced a predetermined distance from the stationary die. When the slide 5 has reached the predetermined position, a hydraulic pressure is supplied by a pump (not shown) to the lock cylinders 23 of the stopper mechanisms 20 which have been adjusted by the height adjusters 27 to provide a predetermined distance, so that the stopper mechanisms 20 are tilted from the broken-line position (a) to the full line position (b), thus locking the slide 5. Subsequently, a molten resin is injected into the cavity 11 by the aforementioned injecting section which is not shown. Meanwhile, a hot fluid, e.g., the oil, is supplied from the tank 15 to the lift cylinder 6 and the lock cylinder 23 so that the lift cylinder 6 and the lock cylinder 23 are heated to expand. The fluid from the same tank 15 is supplied by the pump 16 into the frame 2, slide 5 and the bolster 8 so that these members also are heated to expand. In this state, the predetermined distance (La) and the predetermined shear edge clearance (Lb) are obtained between the dies. To this end, temperature administration ranges shown in the following table 2 are applied.

TABLE 2

| Lengths of slide/bolster (L) | Shear edge clearance (Lb) | Longitudinal thermal expansion of slide/bolster | Temperature administration range |
| --- | --- | --- | --- |
| 500 mm | 0.03 mm | 0.03 mm | 10° C. |
| 1000 mm | 0.03 mm | 0.03 mm | 5° C. |
| 2000 mm | 0.03 mm | 0.03 mm | 2.5° C. |

Figure 4:
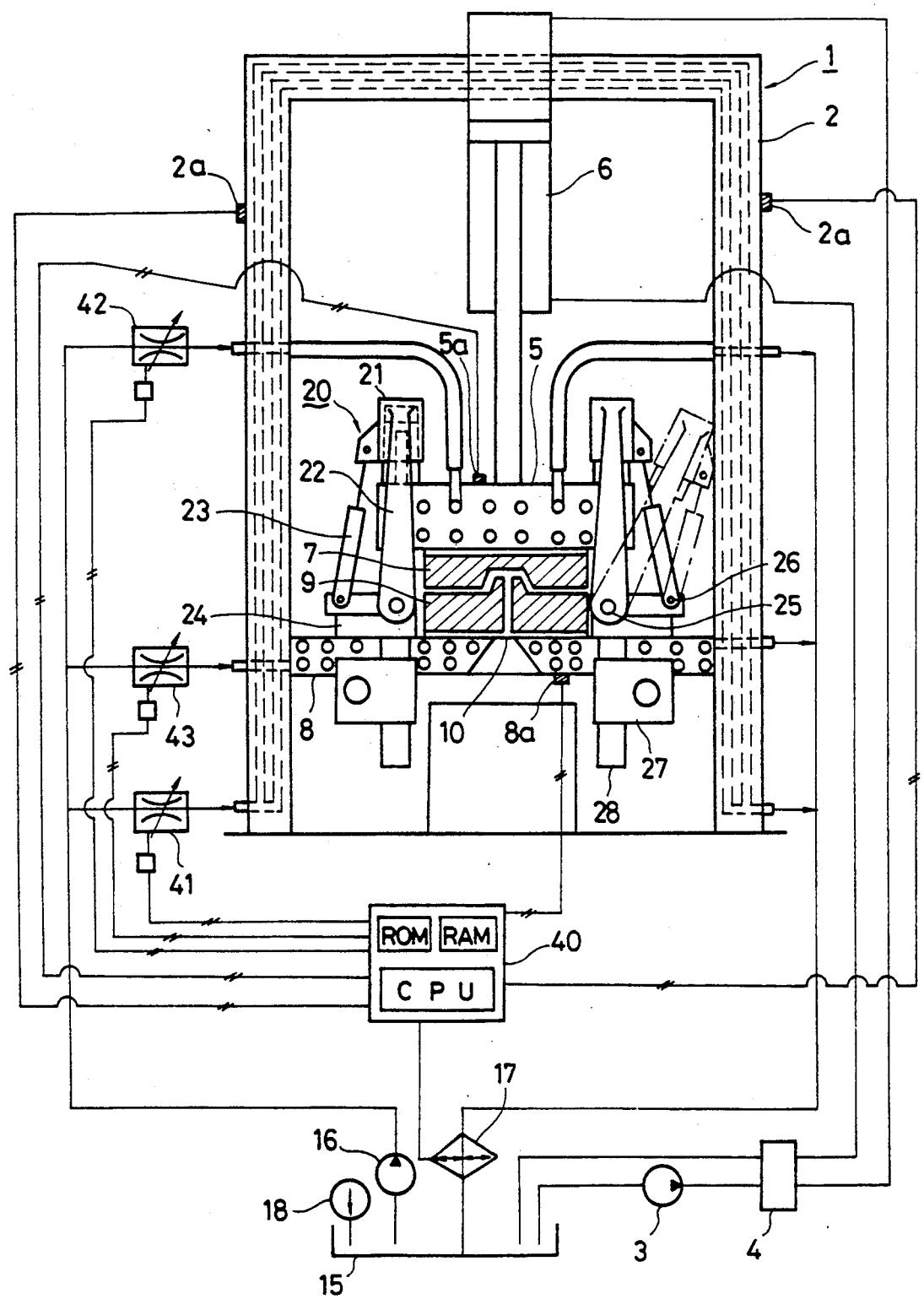
FIG. 4 is a diagrammatic illustration of a second embodiment of the present invention.

A second embodiment of the present invention will be described with reference to FIG. 4. In this FIGURE, the same reference numerals are used to denote the same parts or members and detailed description of such parts or members is omitted. The frame 2, slide 5 and the bolster 8 are provided with temperature sensors 2a, 5a and 8a, respectively. These temperature sensors sense the temperatures of the respective members and feed them back to a controller 40. The frame 2, slide 5 and the bolster 8 also are provided with flow-rate control valves 41, 42 and 43 which are adapted to control the rates of supply of the heating fluid to the frame 2, slide 5 and the bolster 8 in accordance with an instruction given by the controller 40.

In operation, the temperatures of the frame 2, slide 5 and the bolster 8 are sensed and fed back to the controller 40. The controller 40 then conducts predetermined arithmetic operations of the received temperature information, e.g., addition, subtraction and averaging, and delivers instructions to the flow-rate control valves 41, 42 and 43 so as to maintain the initial set temperatures. Upon receipt of these instructions, the flow-rate control valves 41, 42 and 43 control the flow rates of the fluid to these parts so as to maintain the temperatures of these members at the initially set levels.

Figure 5:
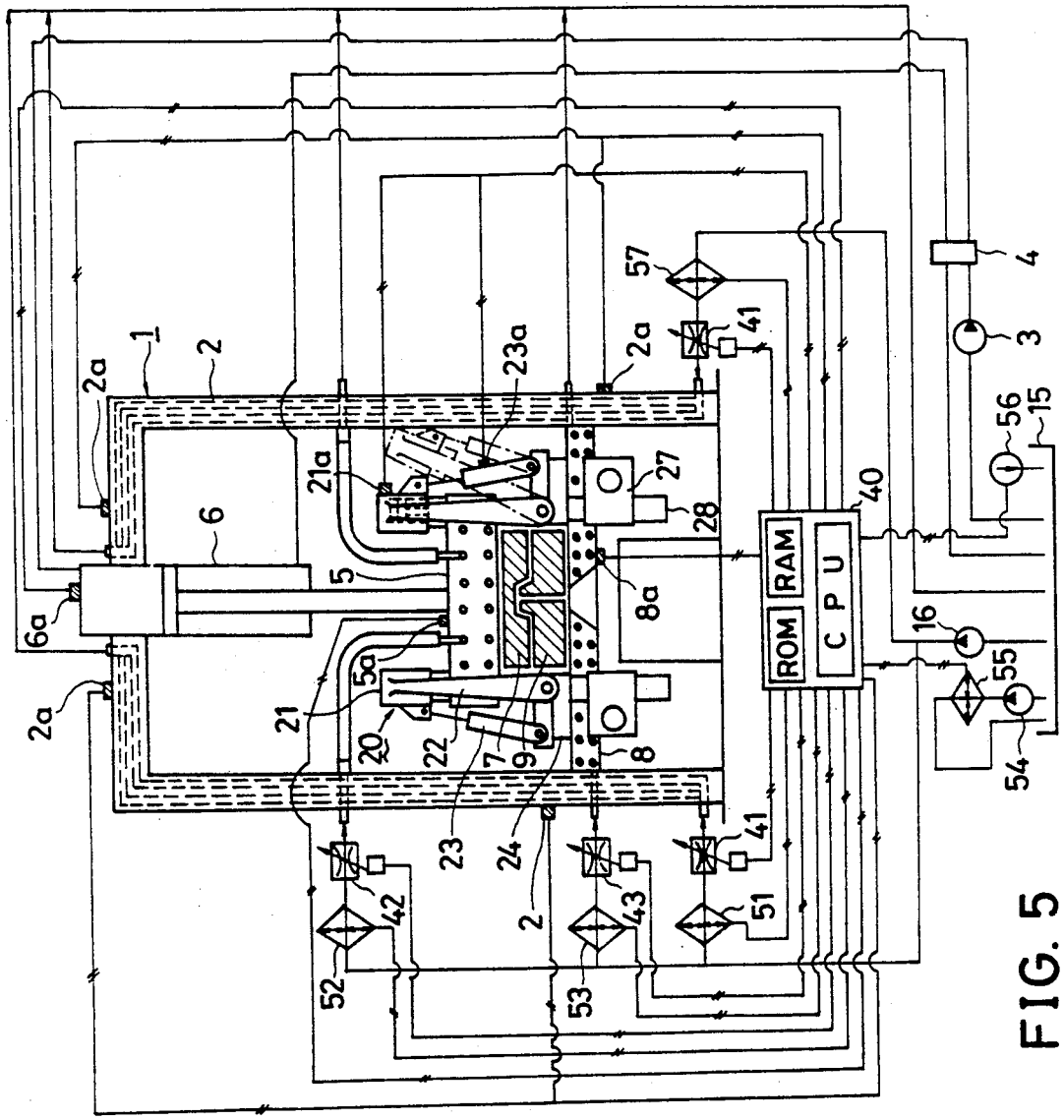
FIG. 5 is a diagrammatic illustration of a third embodiment of the present invention.
Figure 6:
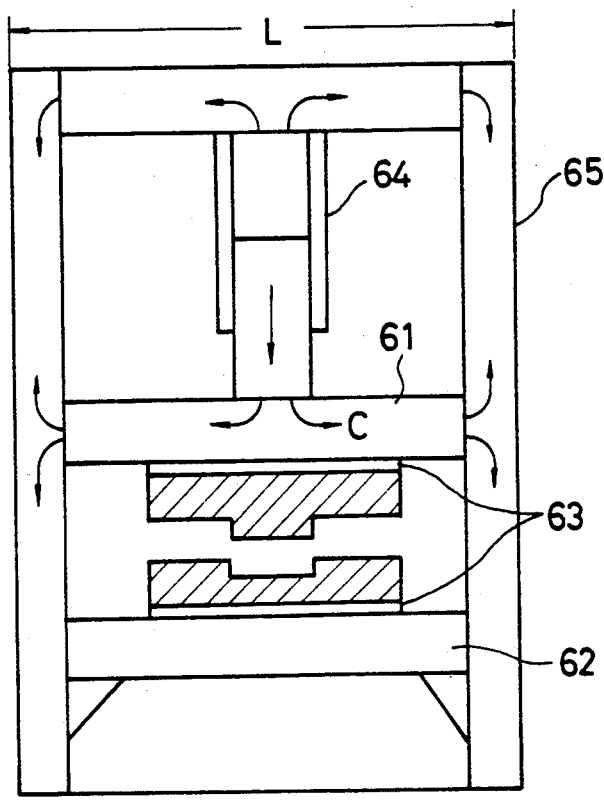
FIG. 6 is an illustration of flow of heat in a conventional plastic compression molding machine.

FIG. 5 shows a third embodiment which employs, in addition to the control of the flow rates of the fluid flowing through the frame 2, slide 5 and the bolster 8, a control of the fluid. In addition, this embodiment employs independent fluid circuits both for the left and right portions of the frame 2. More specifically, the third embodiment employs temperature controllers 51, 52 and 53 on the upstream side of the flow-rate control valves 41, 42 and 43, respectively, so as to control the temperatures of the fluid. The temperatures of the lift cylinder 6, lock cylinders 21 and the compression cylinders 23a are also sensed by temperature sensors 6a, 21a and 23a and fed back to the controller 40. The fluid in the tank 15 is sucked by a pump 54 and circulated through a temperature controller 55 which controls the temperature of the fluid in accordance with an instruction which is given by the controller 40 in accordance with the temperature signal delivered by a temperature sensor 56.

In operation, the controller 40 conducts a computation in accordance with the sensed temperatures of the lift cylinder 6, lock cylinder 21, and the compression cylinder 23, and delivers instructions to the temperature controllers 51, 52 and 53 on the basis of the initially set temperatures thereby controlling the temperatures of the fluid flowing through the frame 2, slider 5 and the bolster 8, while giving instructions to the flow-rate control valves 41, 42 and 43 thereby controlling the flow rates. Although in the illustrated embodiments the temperature controllers 51, 52 and 53 are disposed upstream of the flow-rate control valves 41, 42 and 43, this is only illustrative and the temperature controllers 51, 52 and 53 may be disposed downstream of the flow-rate control valves 41, 42 and 43.

The arrangement also may be such that either the temperatures of the fluid or the flow rates of the fluid are sensed and fed back to control the flow rates or the temperatures of the fluid.

In the embodiment described above, the temperature controller and the flow-rate control valve are provided in the outer side of the member such as the frame. This, however, is not exclusive and the temperature sensor and the flow-rate control valve may be provided inside the frame. It is also possible to control the temperatures of the frame and the bolster with a common fluid circuit, although the described embodiments employ independent fluid circuits for the frame and the bolster. The stopper mechanism used for setting the predetermined distance (La) may obviously be substituted by a suitable mechanism such as a toggle mechanism, parallel link mechanism and so forth.

As has been described, according to the invention, temperature control devices are provided on the structural parts of the plastic compression molding machine surrounding the dies, such as the bolster, slide and the frame, so as to uniformalize the temperatures and amounts of thermal expansion of these structural parts, and a fluid of a temperature controlled by a temperature control means within a predetermined range of temperature administration is circulated through these temperature control devices. As a consequence, a uniform thermal expansion is developed by the mechanical structural parts around the dies such as the crankshaft, bolster, slide and the frame, thus making it possible to maintain a constant shut height of the dies, as well as a constant shear edge clearance which appears laterally of the socket-and-spigot portion. Since the shut height and the shear edge clearance do not fluctuate in successive molding cycles, it is possible to constantly obtain a predetermined thickness of the molded article without burr. In addition, any secular change in the molding condition is suppressed so as to ensure a high stability of the quality of the molded products.

INDUSTRIAL APPLICABILITY

The temperature control apparatus of the invention can be applied to various machines of the type in which a molten resin is injected into and compressed in a cavity formed between dies so as to mold resin products of the same configuration as the die cavity, particularly to compression molding machines in which both dies are fitted together through an socket-and-spigot structure.

We claim:
1. A method of controlling an operating temperature of a bolster, a slide, and a frame in a plastic compression molding machine containing structural members including said bolseter, said slide, and said frame, said bolster and said slide being attached to said frame; each of said structural members having size and thermal expansion coefficients; said bolster being connected to a stationary die; said slide being connected to a movable die; said slide being connected to a lift cylinder for driving said movable die towards said stationary die to form a shut height gap between said dies; said slide having at least one liquid passage provided therein; said bolster having at least one liquid passage provided therein; said frame having at least one liquid passage provided therein; said molding machine having circulating means for supplying working oil from a working oil tank to said lift cylinder and for passing working oil from said lift cylin- der to said working oil tank; which method comprises the steps of:

calculating, from the sizes and thermal expansion coefficients of said bolster, said slide and said frame a value of said operating temperature which maintains the shut height gap between the dies of said machine below a predetermined allowable limit value;

circulating a portion of the working oil from said working oil tank at a first flow rate through said at least one liquid passage of said bolster;

circulating a portion of the working oil from said working oil tank at a second flow rate through said at least one liquid passage of said slide;

circulating a portion of the working oil from said working oil tank at a third flow rate through said at least one liquid passage of said frame; and controlling at least one of the temperature of the portion of the working oil circulating through said at least one liquid passage of said bolster and the flow rate of the portion of the working oil circulating through said at least one liquid passage of said bolster, at least one of the temperature of the portion of the working oil circulating through said at least one liquid passage of said slide and the flow rate of the portion of the working oil circulating through said at least one liquid passage of said slide, and at least one of the temperature of the portion of the working oil circulating through said at least one liquid passage of said frame and the flow rate of the portion of the working oil circulating through said at least one liquid passage of said frame.

2. A method in accordance with claim 1 further comprising:

sensing a temperature of said bolster and providing a first signal representative of the thus sensed temperature of said bolster;

sensing a temperature of said slide and providing a second signal representative of the thus sensed temperature of said slide; and sensing a temperature of said frame and providing a third signal representative of the thus sensed temperature of said frame; and wherein the step of controlling comprises:

controlling, responsive to said first signal, the temperature of the portion of the working oil circulating through said at least one liquid passage of said bolster, controlling, responsive to said second signal, the temperature of the portion of the working oil circulating through said at least one liquid passage of said slide, and controlling, responsive to said third signal, the temperature of the portion of the working oil circulating through said at least one liquid passage of said frame.

3. A method in accordance with claim 1 further comprising:

sensing a temperature of said bolster and providing a first signal representative of the thus sensed temperature of said bolster;

sensing a temperature of said slide and providing a second signal representative of the thus sensed temperature of said slide; and sensing a temperature of said frame and providing a third signal representative of the thus sensed temperature of said frame; and wherein the step of controlling comprises:

controlling, responsive to said first signal, the flow rate of the portion of the working oil circulating through said at least one liquid passage of said bolster, controlling, responsive to said second signal, the flow rate of the portion of the working oil circulating through said at least one liquid passage of said slide, and controlling, responsive to said third signal, the flow rate of the portion of the working oil circulating through said at least one liquid passage of said frame.

4. A method in accordance with claim 1 wherein:

at least one of the temperature of the portion of the working oil circulating through said at least one liquid passage of said bolster and the flow rate of the portion of the working oil circulating through said at least one liquid passage of said bolster is controlled to maintain a temperature of said bolster at a predetermined temperature value, at least one of the temperature of the portion of the working oil circulating through said at least one liquid passage of said slide and the flow rate of the portion of the working oil circulating through said at least one liquid passage of said slide is controlled to maintain a temperature of said slide at a predetermined temperature value, and at least one of the temperature of the portion of the working oil circulating through said at least one liquid passage of said frame and the flow rate of the portion of the working oil circulating through said at least one liquid passage of said frame is controlled to maintain a temperature of said frame at a predetermined temperature value.

5. A method in accordance with claim 1, wherein the temperature of the portion of working oil being circulated through said at least one liquid passage in said bolster is controlled by the passage of that portion through a heat exchanger and also by varying the flow rate of that portion to said bolster, wherein the temperature of the portion of working oil being circulated through said at least one liquid passage in said slide is controlled by the passage of that portion through a heat exchanger and also by varying the flow rate of that portion to said slide, and wherein the temperature of the portion of working oil being circulated through said at least one liquid passage in said frame is controlled by the passage of that portion through a heat exchanger and also by varying the flow rate of that portion to said frame.

6. A method in accordance with claim 1, wherein the temperature of each of said portions of working oil is controlled by the passage of said each portion through a heat exchanger.

7. A method in accordance with claim 1, wherein the temperature of each of said portions of working oil is controlled by varying the flow rate of said each portion.

8. A plastic compression molding machine which comprises: structural members including a bolster, a slide, and a frame, said bolster and said slide being attached to said frame a stationary die supported by said bolster; a movable die supported by said slide; a lift cylinder connected to said slide, said lift cylinder being for driving the movable die towards the stationary die; said bolster having at least one liquid passage provided therein; said slide having at least one liquid passage provided therein; said frame having at least one liquid passage provided therein; a working oil tank; circulating means for supplying working oil from said working oil tank to said at least one liquid passage of said bolster, to said at least one liquid passage of said slide, and to said at least one liquid passage of said frame; and temperature control means for controlling at least one of the temperature of the portion of the working oil circulating through said at least one liquid passage of said bolster and the flow rate of the portion of the working oil circulating through said at least one liquid passage of said bolster, for controlling at least one of the temperature of the portion of the working oil circulating through said at least one liquid passage of said slide and the flow rate of the portion of the working oil circulating through said at least one liquid passage of said slide, and for controlling at least one of the temperature of the portion of the working oil circulating through said at least one liquid passage of said frame and the flow rate of the portion of the working oil circulating through said at least one liquid passage of said frame.

9. A plastic compression molding machine in accordance with claim 8, wherein said temperature control means is capable of controlling the temperature of the portion of said working oil circulating through said at least one liquid passage of said bolster, the temperature of the portion of said working oil circulating through said at least one liquid passage of said slide, and the temperature of the portion of said working oil circulating through said at least one liquid passage of said frame to levels which maintain a dimensional change of the clearance between said dies below a predetermined allowable limit.

10. A plastic compression molding machine in accordance with claim 8, wherein said temperature control means includes a first flow-rate control valve for controlling the flow rate of the portion of the working oil circulating through said at least one liquid passage of said bolster, a second flow-rate control valve for controlling the flow rate of the portion of the working oil circulating through said at least one liquid passage of said slide, and a third flow-rate control valve for controlling the flow rate of the portion of the working oil circulating through said at least one liquid passage of said frame.

11. A plastic compression molding machine in accordance with claim 10, further comprising means for controlling the temperature of the working oil in said working oil tank.

12. A plastic compression molding machine in accordance with claim 10, wherein said temperature control means includes a first heat exchanger for controlling the temperature of the portion of the working oil circulating through said at least one liquid passage of said bolster, a second heat exchanger for controlling the temperature of the portion of the working oil circulating through said at least one liquid passage of said slide, and a third heat exchanger for controlling the temperature of the portion of the working oil circulating through said at least one liquid passage of said frame.

13. A plastic compression molding machine in accordance with claim 12, further comprising means for controlling the temperature of the working oil in said working oil tank.

14. A plastic compression molding machine in accordance with claim 8, wherein said temperature control means includes a first heat exchanger for controlling the temperature of the portion of the working oil circulating through said at least one liquid passage of said bolster, a second heat exchanger for controlling the temperature of the portion of the working oil circulating through said at least one liquid passage of said slide, and a third heat exchanger for controlling the temperature of the portion of the working oil circulating through said at least one liquid passage of said frame.

15. A plastic compression molding machine in accordance with claim 14, further comprising means for controlling the temperature of the working oil in said working oil tank.

16. A plastic compression molding machine which comprises: structural members including a bolster, a slide, and a frame, said bolster and said slide being attached to said frame; a stationary die supported by said bolster; a movable die supported by said slide; a lift cylinder connected to said slide, said lift cylinder being for driving the movable die towards the stationary die; said bolster having at least one liquid passage provided therein; said slide having at least one liquid passage provided therein; said frame having at least one liquid passage provided therein; a working oil tank; circulating means for supplying working oil from said working oil tank to said at least one liquid passage of said bolster, to said at least one liquid passage of said slide, and to said at least one liquid passage of said frame; a first temperature sensor for sensing a temperature of said bolster and producing a first signal representative of the thus sensed temperature of said bolster; a second temperature sensor for sensing a temperature of said slide and producing a second signal representative of the thus sensed temperature of said slide; a third temperature sensor for sensing a temperature of said frame and producing a third signal representative of the thus sensed temperature of said frame; and temperature control means for controlling, responsive to said first signal, at least one of the temperature of the portion of the working oil circulating through said at least one liquid passage of said bolster and the flow rate of the portion of the working oil circulating through said at least one liquid passage of said bolster, and for controlling, responsive to said second signal, at least one of the temperature of the portion of the working oil circulating through said at least one liquid passage of said slide and the flow rate of the portion of the working oil circulating through said at least one liquid passage of said slide, and for controlling, responsive to said third signal, at least one of the temperature of the portion of the working oil circulating through said at least one liquid passage of said frame and the flow rate of the portion of the working oil circulating through said at least one liquid passage of said frame.

17. A plastic compression molding machine in accordance with claim 16, wherein said frame has at least one first liquid passage in a first portion of said frame and at least one second liquid passage in a second portion of said frame; wherein said circulating means supplies working oil from said working oil tank to said at least one first liquid passage in said first portion of said frame and to said at least one second liquid passage in said second portion of said frame; wherein said third temperature sensor senses a temperature of said first portion of said frame; further comprises a fourth temperature sensor for sensing a temperature of said second portion of said frame and providing to said temperature control means a fourth signal representative of the thus sensed temperature of said second portion of said frame; and wherein said temperature control means controls, responsive to said third signal, at least one of the temperature of the portion of the working oil circulating through said at least one first liquid passage of said first portion of said frame and the flow rate of the portion of the working oil circulating through said at least one first liquid passage of said first portion of said frame, and controls, responsive to said fourth signal, at least one of the temperature of the portion of the working oil circulating through said at least one second liquid passage of said second portion of said frame and the flow rate of the portion of the working oil circulating through said at least one second liquid passage of said second portion of said frame.

18. A plastic compression molding machine in accordance with claim 17, further comprising a fifth temperature sensor for sensing the temperature of the working oil in said working oil tank and for producing a fifth signal representative of the thus sensed temperature of the working oil in said working oil tank, and means for controlling, responsive to said fifth signal, the temperature of the working oil in said working oil tank.

19. A plastic compression molding machine in accordance with claim 16, wherein said temperature control means includes a first flow-rate control valve for controlling the flow rate of the portion of the working oil circulating through said at least one liquid passage of said bolster, a second flow-rate control valve for controlling the flow rate of the portion of the working oil circulating through said at least one liquid passage of said slide, and a third flow-rate control valve for controlling the flow rate of the portion of the working oil circulating through said at least one liquid passage of said frame.

20. A plastic compression molding machine in accordance with claim 19, wherein said temperature control means includes a first heat exchanger for controlling the temperature of the portion of the working oil circulating through said at least one liquid passage of said bolster, a second heat exchanger for controlling the temperature of the portion of the working oil circulating through said at least one liquid passage of said slide, and a third heat exchanger for controlling the temperature of the portion of the working oil circulating through said at least one liquid passage of said frame.

21. A plastic compression molding machine in accordance with claim 20, further comprises a fourth temperature sensor for sensing the temperature of working oil in said working oil tank and providing to said temperature control means a fourth signal representative of the thus sensed temperature of the working oil in said working oil tank.

22. A plastic compression molding machine in accordance with claim 16, wherein said temperature control means includes a first heat exchanger for controlling the temperature of the portion of the working oil circulating through said at least one liquid passage of said bolster, a second heat exchanger for controlling the temperature of the portion of the working oil circulating through said at least one liquid passage of said slide, and a third heat exchanger for controlling the temperature of the portion of the working oil circulating through said at least one liquid passage of said frame.

23. A plastic compression molding machine in accordance with claim 16, wherein said circulating means further comprises means for passing working oil from said working oil tank to said lift cylinder and for passing working oil from said lift cylinder to said working oil tank.

* * * * *